D. E. BARTH & S. F. COLLINS.
COOKING VESSEL.
APPLICATION FILED SEPT. 8, 1915.

1,214,409.	Patented Jan. 30, 1917.

Witnesses
A. E. Newkirk
John J. McCarthy

Inventors
D. E. Barth
S. F. Collins
By Victor J. Evans
Attorney

UNITED STATES PATENT OFFICE.

DELPHA E. BARTH AND SAMUEL F. COLLINS, OF TELLURIDE, COLORADO.

COOKING VESSEL.

1,214,409.     Specification of Letters Patent.     Patented Jan. 30, 1917.

Application filed September 3, 1915. Serial No. 49,572.

*To all whom it may concern:*

Be it known that we, DELPHA E. BARTH and SAMUEL F. COLLINS, citizens of the United States, residing at Telluride, in the county of San Miguel and State of Colorado, have invented new and useful Improvements in Cooking Vessels, of which the following is a specification.

This invention relates to certain novel and useful improvements in cooking vessels and has particular application to a roasting pan.

In carrying out the present invention, it is our purpose to provide a roasting pan whereby the steam or vapor ascending from the article within the pan, during the roasting operation, will be condensed and redelivered to the article in liquid form, thereby rendering the pan self-basting.

It is also our purpose to provide a pan of the class described whereby the top of the article being roasted will be protected against burning and wherein the top of the pan will be so formed as to seat firmly upon the upper edge of the bottom of the pan, thereby preventing leakage of the basting fluid from the pan during the roasting process.

With the above and other objects in view, the invention consists in the construction, combination and arrangement of parts hereinafter set forth in and falling within the scope of the claim.

Figure 1:
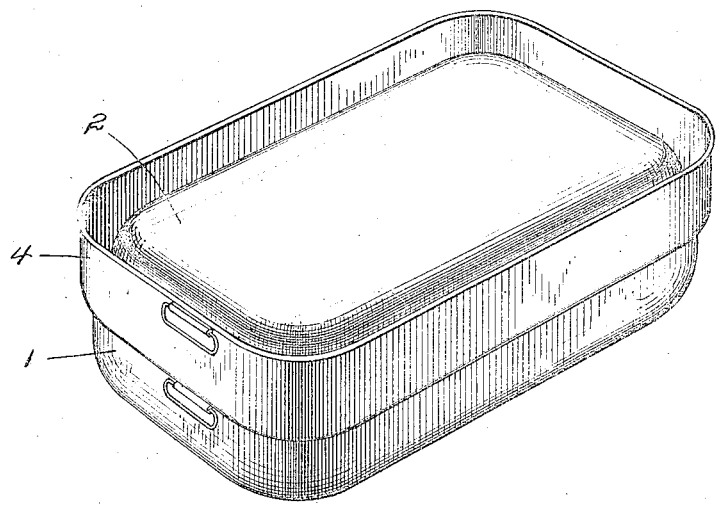
Figure 2:
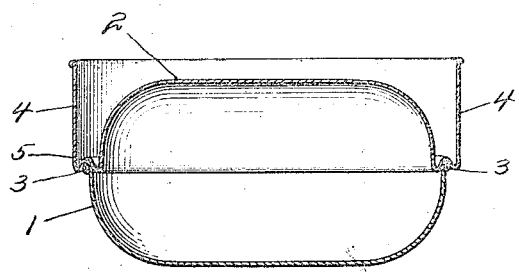

In the accompanying drawing, Figure 1 is a perspective view of a roasting pan constructed in accordance with our present invention. Fig. 2 is a cross sectional view therethrough.

Referring now to the drawing in detail, 1 designates the bottom portion of a roasting pan, such portion having the side and end walls curved upwardly from the bottom wall and having the corners, formed by the side and end walls, rounded.

2 designates the cover of the pan and in accordance with our present invention, the cover 2 of the pan has the side and end walls thereof curved downwardly from the top wall and the corners formed by the downwardly projecting side and end walls rounded. The side and end walls at their lower ends are bent outwardly at right angles to themselves as at 3 and then extended upwardly vertically in the form of flanges 4 and the upper edges of the flanges 4 on the side and end walls of the top of the pan project above the top wall of the pan cover. The outwardly extending portions 3 at the lower ends of the side and end walls of the cover of the pan are formed with longitudinally extending grooves 5 that receive the upper edges of the side and end walls of the bottom 1 of the pan so as to form a fluid tight joint between the cover and the bottom of the pan, thereby preventing the escape of the basting fluid from the pan during the roasting process.

In practice, the article to be roasted is placed in the bottom 1 of the pan and the cover 2 placed over such article, the upper edges of the side and end walls of the bottom of the pan being disposed within the grooves 5 in the outwardly projecting portions 3 of the cover of the pan. The flanges 4, the top wall of the cover 2 and the downwardly projecting side and end walls of the pan constitute a receptacle adapted to contain a quantity of water and this water serves to prevent the burning of the top of the article being roasted and at the same time maintains the cover comparatively cool so that the vapor issuing from the article being roasted will be condensed and permitted to drip back onto such article, thereby basting the article.

We claim:

A self-basting roasting pan comprising a bottom portion having upwardly extending side and end walls and a cover for the bottom portion comprising a top wall and downwardly projecting side and end walls, said downwardly projecting side and end walls having the lower edges thereof projecting outwardly and then extended upwardly to form vertical flanges of a height greater than the height of the top wall of the cover, said flanges coöperating with the top of the cover and the side and end walls of the cover to form a receptacle adapted to contain a quantity of water, the outwardly extending lower edge portions of the side and end walls of said cover being curved in cross section to form grooves to receive the upper edges of the side and end walls of the bottom of the pan to form a fluid tight joint between the cover and the bottom.

In testimony whereof we affix our signatures in presence of two witnesses.

DELPHA E. BARTH.
SAMUEL F. COLLINS.

Witnesses:
A. HILGENHAUS,
CLARA I. COLLINS.